Figure 1:
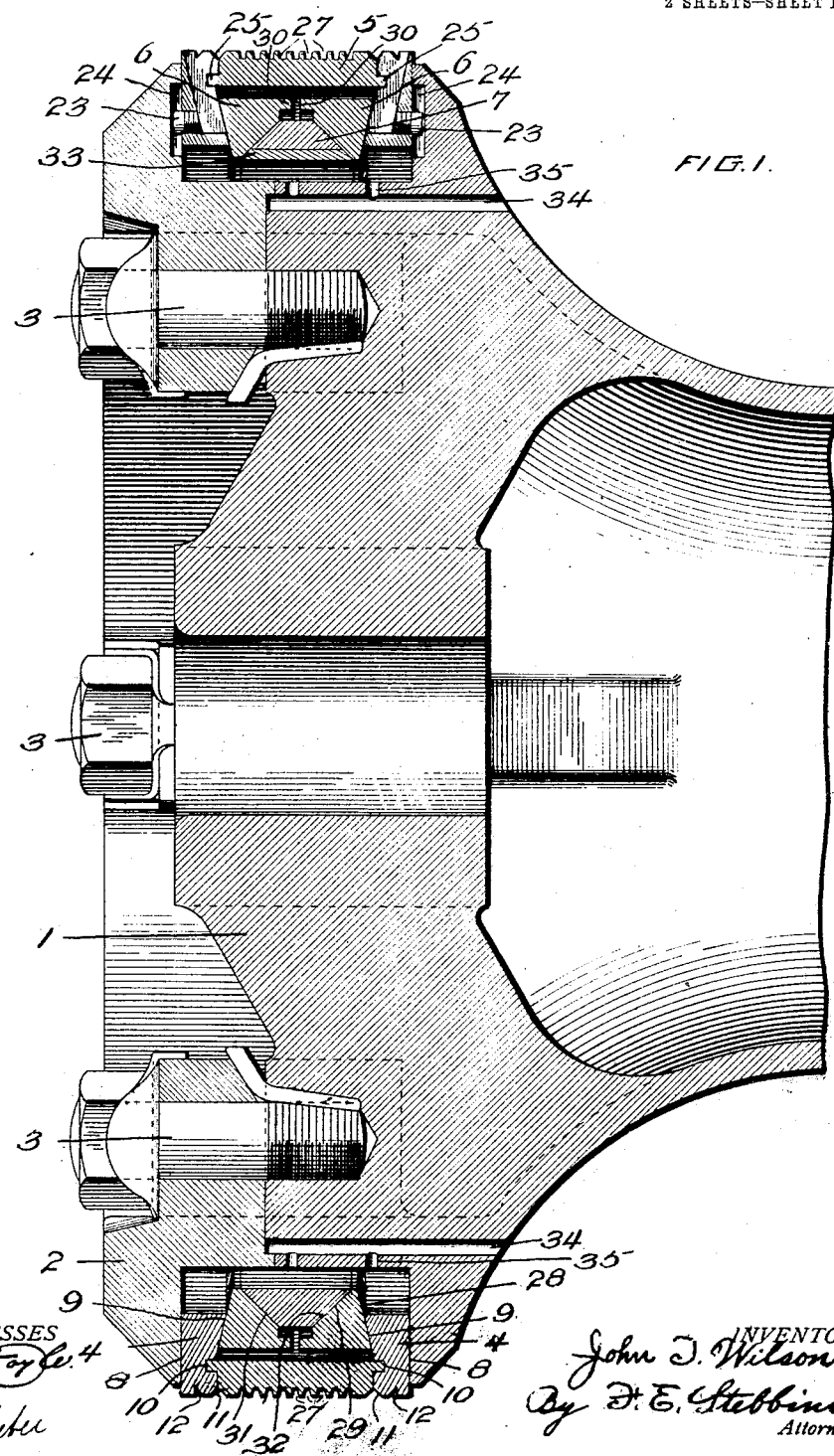

J. T. WILSON.
PISTON VALVE.
APPLICATION FILED NOV. 15, 1912.

1,072,681.

Patented Sept. 9, 1913.
2 SHEETS—SHEET 1.

WITNESSES

INVENTOR
John T. Wilson,
By F. E. Stebbins.
Attorney

J. T. WILSON.
PISTON VALVE.
APPLICATION FILED NOV. 15, 1912.
1,072,681.
Patented Sept. 9, 1913.
2 SHEETS—SHEET 2.
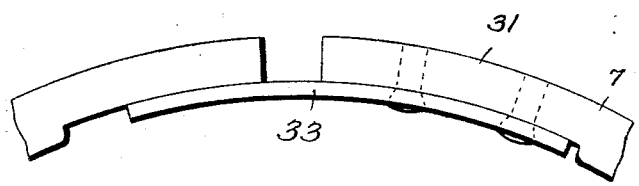
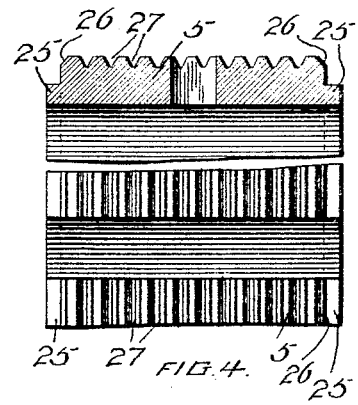
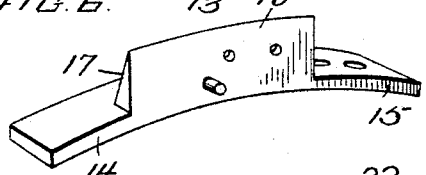
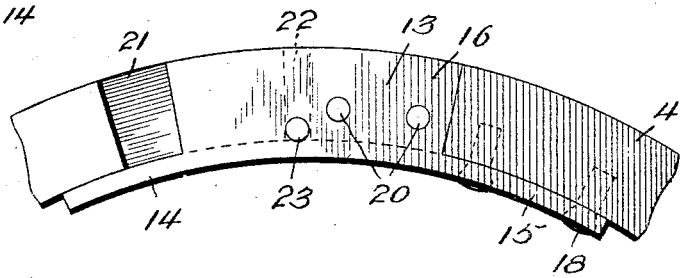
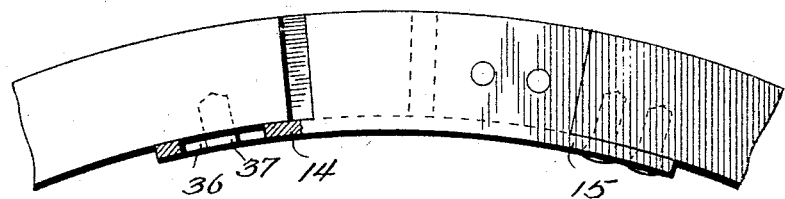
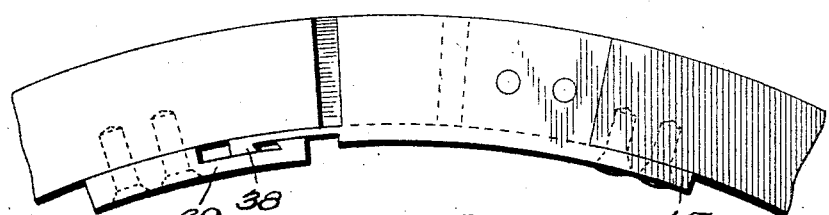

UNITED STATES PATENT OFFICE.

JOHN T. WILSON, OF JERSEY SHORE, PENNSYLVANIA.

PISTON-VALVE.

1,072,381.

Specification of Letters Patent.  Patented Sept. 2, 1913.

Application filed November 15, 1912. Serial No. 731,585.

*To all whom it may concern:*

Be it known that I, JOHN T. WILSON, a citizen of the United States, residing at Jersey Shore, in the county of Lycoming and State of Pennsylvania, have invented certain new and useful Improvements in Piston-Valves, of which the following is a specification.

The packing rings of semi-plug piston valves are expanded by live steam admitted beneath the packing so that they will closely fit the valve cage, then the steam pressure locks and holds the rings in fixed positions until the steam pressure is removed when the packing rings contract. The successive expansions of the rings in repeated service compensate for the wear of the same by slightly increasing their diameters, and consequently, as no inspection is necessary, the rings are often continued in use until they are excessively worn away, when they break or are in danger of breaking.

The main object of the present improvements is the provision of means for positively limiting the expansion of the rings to a degree commensurate with the extreme amount of wear of the same which can be allowed with safety, so that when the predetermined limit of expansion has been reached subsequent wear of the rings cannot be taken up and so that steam will pass between the cage and the packing rings and give notice that the rings have been worn to the predetermined amount and that new rings must be substituted.

A further object is the construction and combination of the several rings of the packing in such a way that they will be locked in the recess within which they are normally disposed, and so that a packing ring cannot be dislodged and torn out, even should it be expanded to an excessive degree into a port.

With these ends in view, the invention consists, first, in certain novelties of construction and combinations of parts whereby the degree of expansion of each expansible packing or snap ring is positively limited, the limit depending upon the degree of permissible wear of the exterior surface of the ring; and, secondly, in so fashioning the integral wall rings and other rings of the packing and so combining them that the movements of the wall rings toward each other will be limited and all the rings be locked within the recess within which they are located.

The accompanying drawings illustrate the embodiments of the improvements, four examples of means for limiting the expansion of the packing rings being shown, which disclose the best modes I have so far devised for the practical application of the principle.

Figure 1 is a vertical section in elevation of one end of a piston valve illustrating the elements constituting the packing, the section of the top being through the lap joints of the packing rings. Fig. 2 shows the lap joint of the wedge ring. Fig. 3 is a cross section of the expansible wide ring. Fig. 4 illustrates the adjacent separated ends of the wide ring and part of the inner surface of the ring. Fig. 5 shows the lap joint of a packing ring. Fig. 6 is a view in perspective of the joint plate shown by Fig. 5. Figs. 7 and 8 illustrate snap ring lap joints which limit the expansion of the rings.

The numeral 1 designates the spool and 2 the follower, both of which may be of any approved construction, detachably secured together by threaded studs 3. Between the circumferential flanges of the spool and follower is a circular recess, as shown, within which the packing as a whole is removably confined.

The packing comprises two expansible packing rings 4, an expansible wide ring 5, two integral non-expansible wall rings 6, and an expansible wedge ring 7.

Each packing ring has a vertical surface 8, a beveled surface 9, a circumferential groove 10 in the beveled surface, an inner beveled edge 11, and a circumferential groove 12 in its exterior surface preferably defined by an outer vertical surface and an inner beveled surface or surface oblique to said vertical surface, the groove being located about three-sixteenths of an inch from the outer edge of the ring, as shown. Each ring is provided with a lap joint (see Figs. 5 and 6) formed by a joint plate 13 having a base with ends 14, 15 and a flange 16 with a beveled surface 17. The surfaces of the ends of a packing ring are beveled to engage the beveled surface 17 of the joint plate flange and the joint plate is fixedly secured to one end of the packing ring by studs 18 and 20. The end 14 of the base movably bears against the under surface of one end of the packing ring, and open spaces are provided at 21 and 22 to permit the expansion and contraction of the ring. Each packing ring joint is preferably located so as to travel over a bridge in the cage and a pin 23 seated in the ring and with its projecting end movably located within an elongated recess 24 in a flange of the follower or spool prevents the circumferential displacement of the ring from its proper position.

The expansible wide ring 5 (see Figs. 3 and 4) has tongues 25 loosely seated within the grooves 10 in the snap rings, beveled edges 26, and spaced circumferential grooves 27 in its outer surface. The adjacent ends of the ring are slightly separated, as shown by Fig. 4. Each integral wall ring 6 has beveled surfaces 28, 29, and a flange 30, the flanges of the two wall rings normally being spaced apart the fraction of an inch, as shown. The expansible wedge ring 7 (see Fig. 2) has beveled edges 31, 32 and its ends are spaced apart, the joint plate 33 being secured to one end of the ring and lapped beneath the other end to form a steam-tight joint.

The top and bottom sections of the packing shown by Fig. 1 clearly illustrate the relative reciprocal locations of the rings, the top section being taken through the lapped joints of the packing and wedge rings.

The mode of operation is as follows: Live steam, being admitted to the space between the flanges of the spool, passes to the under surfaces of the entire packing by way of the circumferential series of holes 34 and 35 in the spool. The packing rings 4, 4 and wide ring 5 are expanded by the steam pressure till their exterior surfaces are in contact with the interior surface of the cage, and the wedge ring 7 expanding forces the wall rings 6, 6 sidewise and apart against the beveled surfaces of the packing rings and locks and holds them in fixed positions until steam pressure is withdrawn, when the expansible rings slightly contract. As the exterior surfaces of the packing rings 4, 4 gradually wear away in repeated service, said rings will expand further and further, that is, successively increase their diameters, until the wall rings are moved toward each other so the flanges 30 come in contact. Further wear of the exterior surfaces of the packing rings, inasmuch as the wall rings in contact prevent further expansion of the packing rings, leaves an open space between the exterior surfaces of the packing rings and the inner surface of the cage through which live steam blows and indicates that the rings are worn to the predetermined limit.

The means for limiting the degree of expansion of the packing rings as disclosed obviously consists of the wall rings with the flanges 30 spaced apart the required distance, when the packing rings are new or unworn, and said wall rings are effective in attaining the desired end. However, other means may be employed for the same purpose, to wit: The ends of the wedge ring (see Fig. 2) may be suitably spaced apart so that when the packing rings expand under wear to the desired limit, forcing the wall rings nearer together, the movements of said wall rings will contract the wedge ring till its opposite ends come in contact. When the ends of the wedge ring meet the wall rings cannot move further toward each other, and consequently the packing rings are held against further expansion. The end 14 of each joint plate (see Fig. 7) may be provided with a slot 36 and a pin 37 be seated in the adjacent end of the packing ring with its end projecting into the slot and so disposed as to limit the degree of expansion of the packing ring. The end of each joint plate 14 (see Fig. 8) may be provided with a hook 38 and a hooked plate 39 be secured to the under surface of the adjacent end of the packing ring, the engagement of the hooked ends of the plates limiting the expansion of the packing ring.

Other analogous means may be employed in lieu of the foregoing described means for limiting the degrees of expansions of the packing rings without constituting substantial departures in the application of the principle.

The particular construction of the wall rings and their disposition relative to the other rings so that the travel of one toward the other, or both toward each other, is limited prevents a packing ring from being displaced, inasmuch as the wall rings lock them within the recess formed between the flanges of the spool and follower.

From the foregoing description taken in connection with the drawings it becomes clear that I have produced a piston valve embodying improvements of construction and combinations of parts which are effective in attaining the modes of operation set forth as the objects of the invention.

What I claim is:

1. A piston valve having a packing comprising a resilient expansible packing ring, means for admitting steam beneath the packing ring to expand the same, and means for positively limiting the degree of expansion of the said packing ring.

2. A piston valve having a packing comprising two resilient expansible packing rings, and means for positively limiting the expansions of said rings to degrees corresponding to the desired wear of the exterior surfaces of said rings.

3. A piston valve having a packing comprising two expansible packing rings, means for admitting steam beneath the rings to expand them, and means for positively limiting the degrees of expansion of the said rings.

4. A piston valve having a packing comprising two expansible packing rings, a ring between said packing rings, and means for limiting the degrees of expansion of the packing rings.

5. A piston valve having a packing comprising two expansible packing rings each with a circumferential groove in its side surface, an expansible ring with tongues at its side edges seated within the grooves in the sides of the packing rings, and means for limiting the degrees of expansion of the packing rings.

6. A piston valve having a packing comprising an expansible packing ring, an integral wall ring, an expansible wedge ring, and means for positively limiting the expansion of the packing ring to a degree corresponding to the wear of said ring.

7. A piston valve having a packing comprising an expansible packing ring, an integral wall ring, an expansible wedge ring, means for admitting steam beneath said rings to expand the packing and wedge rings, and means for positively limiting the expansion of the packing ring.

8. A piston valve having a packing comprising an expansible packing ring with a beveled surface, an integral wall ring with beveled surfaces, and an expansible wedge ring with a beveled surface; the ends of the wedge ring being suitably spaced apart to limit the expansion of the packing ring when the exterior surface thereof has been worn away.

9. A piston valve having a packing comprising two expansible packing rings each with a beveled surface, two integral wall rings each with two beveled surfaces, an expansible wedge ring, means for admitting steam to the under surfaces of said rings, and means for limiting the degrees of expansion of the packing rings.

10. A piston valve having a packing comprising two expansible packing rings each with a beveled surface, two integral wall rings each with two beveled surfaces, an expansible wedge ring, and means for admitting steam to the under surfaces of the rings; the wall rings being so disposed relative to each other and to the packing rings that when said wall rings move into contact with each other the packing rings are prevented from further expansion.

11. A piston valve having a packing comprising two expansible packing rings each with a beveled surface, two integral wall rings each with two beveled surfaces and a flange 30, an expansible wedge ring, and means for admitting steam to the under surfaces of said rings.

12. A piston valve having a packing comprising two expansible packing rings each with a beveled surface, two integral wall rings each with two beveled surfaces, an expansible wedge ring, and means for admitting steam to the under surfaces of the rings; the ends of the wedge ring being spaced apart so that when the ends meet the wall rings will be limited in their movements toward each other and the packing rings be held against further expansion.

13. A piston valve having a packing comprising two expansible packing rings each with a beveled side and with a groove therein, an expansible wide ring having tongues loosely seated within the grooves in the packing rings, two integral wall rings each with two beveled surfaces, an expansible wedge ring, means for admitting steam beneath the packing, and means for limiting the degrees of expansion of the packing rings.

14. A piston valve having a packing comprising two expansible packing rings each with a beveled side and with a groove therein, an expansible wide ring having tongues loosely seated within the grooves in the packing rings, two integral wall rings each having two beveled surfaces and a flange, an expansible wedge ring, and means for admitting steam beneath the packing.

15. A piston valve having a packing comprising two expansible packing rings each with a beveled side and with a groove therein, an expansible wide ring having tongues loosely seated within the grooves in the packing rings, two integral wall rings each having two beveled surfaces, an expansible wedge ring, means for admitting steam beneath the packing, and means for limiting the travel of the wall rings toward each other.

16. A piston valve having a packing comprising two expansible packing rings each with a beveled side and with a groove therein, an expansible wide ring having tongues loosely seated within the grooves in the packing rings, two integral wall rings each having two beveled surfaces, an expansible wedge ring, and means for admitting steam beneath the packing, the beveled surfaces of said rings being such that the rings interlock, and whereby the packing rings cannot be forced or drawn from the valve within which said packing and whereby the wall rings cannot be placed.

17. A piston valve having a packing comprised of a plurality of rings in frictional contact one of which is an expansible packing ring, and means for limiting the degree of expansion of the packing ring when the exterior surface thereof has been worn to a predetermined amount.

18. An expansible packing ring having a joint plate secured to one end and the other end provided with means located at the under surface thereof for connecting said end to the joint plate, said means being movable a limited distance relative to the joint plate, for the purpose specified.

In testimony whereof I affix my signature in presence of two witnesses.

JOHN T. WILSON.

Witnesses:
 ALLEN J. FRANTZ,
 W. B. HARLAN.